United States Patent
Ma et al.

(10) Patent No.: US 12,055,833 B2
(45) Date of Patent: Aug. 6, 2024

(54) THIN FILM TRANSISTOR LIQUID CRYSTAL DISPLAY PANEL AND PREPARATION METHOD THEREOF

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Jian Ma, Beijing (CN); Jinliang Hu, Beijing (CN); Wenming Ren, Beijing (CN); Ran Zhang, Beijing (CN); Haiyang Jia, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 178 days.

(21) Appl. No.: 17/310,427

(22) PCT Filed: Jan. 14, 2021

(86) PCT No.: PCT/CN2021/071683
§ 371 (c)(1),
(2) Date: Aug. 2, 2021

(87) PCT Pub. No.: WO2021/164476
PCT Pub. Date: Aug. 26, 2021

(65) Prior Publication Data
US 2022/0317493 A1   Oct. 6, 2022

(30) Foreign Application Priority Data
Feb. 20, 2020   (CN) .......................... 202010110578.8

(51) Int. Cl.
*G02F 1/1333*   (2006.01)
*G02F 1/1339*   (2006.01)
(Continued)

(52) U.S. Cl.
CPC ...... *G02F 1/1368* (2013.01); *G02F 1/133345* (2013.01); *G02F 1/1339* (2013.01);
(Continued)

(58) Field of Classification Search
CPC ............. G02F 1/1333; G02F 1/133345; G02F 1/133357; G02F 1/1337; G02F 1/1339;
(Continued)

(56) References Cited

U.S. PATENT DOCUMENTS 7,038,740 B1 *   5/2006   Katsuya ............ G02F 1/133502
                                                        349/139
2014/0022480 A1   1/2014   Yokoyama et al.
(Continued)

FOREIGN PATENT DOCUMENTS

| CN | 103794510 A | 5/2014 |
|---|---|---|
| CN | 104508548 A | 4/2015 |

(Continued)

*Primary Examiner* — Thoi V Duong
(74) *Attorney, Agent, or Firm* — Kinney & Lange, P.A.

(57) ABSTRACT

The present disclosure provides a thin film transistor liquid crystal display panel and a preparation method thereof. The display panel has an array substrate, an opposite substrate and a frame sealant, and has a substrate layer, a first protective passivation layer, an organic film layer, and a second protective passivation layer, wherein an orthographic projection of the second protective passivation layer on the substrate extends to an outer region outside the frame sealant. The display panel further has a water insulation layer, which covers a portion of the second protective passivation layer where its orthographic projection on the substrate layer is in the outer region, such that the second (Continued)

protective passivation layer is not in contact with an external environment of the display panel. The thin film transistor liquid crystal display panel provided in the present disclosure may prevent the exhaust gas of the organic film from influencing the TFT performances, while ensuring the water resistance of the display panel under harsh conditions.

11 Claims, 7 Drawing Sheets

(51) Int. Cl.
*G02F 1/1343* (2006.01)
*G02F 1/1362* (2006.01)
*G02F 1/1368* (2006.01)

(52) U.S. Cl.
CPC .. *G02F 1/134309* (2013.01); *G02F 1/136227* (2013.01); *G02F 2201/50* (2013.01); *G02F 2202/16* (2013.01)

(58) Field of Classification Search
CPC ............... G02F 1/13398; G02F 1/1343; G02F 1/134309; G02F 1/134318; G02F 1/134363; G02F 1/1362; G02F 1/136227; G02F 1/136277; G02F 1/1368; G02F 2201/50; G02F 2202/16; H01L 27/1225

See application file for complete search history.

(56) References Cited

U.S. PATENT DOCUMENTS

| 2014/0027791 A1 | 1/2014 | Cho et al. |
| 2014/0120657 A1 | 5/2014 | Hung et al. |
| 2016/0093645 A1* | 3/2016 | Lee .................... H01L 27/1296 257/43 |
| 2020/0027958 A1* | 1/2020 | Suzuki ............. H01L 29/66969 |

FOREIGN PATENT DOCUMENTS

| CN | 105446031 A | 3/2016 |
| CN | 209911702 U | 1/2020 |
| CN | 111435210 A | 7/2020 |

* cited by examiner

THIN FILM TRANSISTOR LIQUID CRYSTAL DISPLAY PANEL AND PREPARATION METHOD THEREOF

CROSS REFERENCE TO RELATED APPLICATION(S)

The present application is a Section 371 National Stage Application of International Application No. PCT/CN2021/071683, filed Jan. 14, 2021, which in turn claims a priority of Chinese Patent Application No. 202010110578.8, filed on Feb. 20, 2020, both of which are incorporated herein by reference in their entireties.

BACKGROUND

The present disclosure relates to the field of thin film transistor liquid crystal display, and particularly to a thin film transistor liquid crystal display panel and a preparation method thereof.

Oxide thin film transistors are increasingly being used in thin film transistor (TFT) liquid crystal display panels. In oxide thin film transistors, oxide semiconductors are used as the material for an active layer in place of α-Si semiconductors more commonly previously used in the thin film transistors. Oxide semiconductors have several advantages, including high migration rates, good homogeneity across larger areas, and low temperatures for preparation, and have the potential to be used in the next generation of flat panel displays.

A α-Si thin film transistor of a display panel in related art cannot be simply replaced with the oxide thin film transistor. A thin film transistor-based display panel generally has a plurality of film layers, some of which are organic films. In systems using organic films, problems can arise due to outgassing, i.e., emission of sublimated gas to its ambient environment. Such gas has little effect on the α-Si semiconductor in the α-Si thin film transistor, but in an oxide thin film transistor-based display panel, exhaust gas may interact with the oxide semiconductor active layer, thereby adversely influencing the performances of the oxide thin film transistor severely.

There is a need to reduce or prevent the effect of outgassing for the thin film transistor in the display panel comprising components susceptible to be damaged by the exhaust gas of the organic film.

The demand for a thin film transistor liquid crystal display panel capable of maintaining performance under harsh conditions continues to increase. Current thin film transistor liquid crystal display panels need to have better performances in the Pressure Cooker Test (PCT).

There is a need for improving the thin film transistor liquid crystal display panel.

SUMMARY

In an aspect, the present disclosure provides a thin film transistor liquid crystal display panel having an active display area and a frame area, comprising:

an array substrate and an opposite substrate opposite to the array substrate, wherein the array substrate comprises a substrate layer and a thin film transistor on a side of the substrate layer close to the opposite substrate;

a liquid crystal layer and a spacer between the array substrate and the opposite substrate; and a frame sealant for bonding the array substrate and the opposite substrate in the frame area, wherein an orthographic projection of the frame sealant on the substrate layer divides the frame area into an inner region surrounded by the orthographic projection of the frame sealant, a frame sealant region in which the orthographic projection of the frame sealant is located, and an outer region outside the orthographic projection of the frame sealant, wherein the display panel further comprises a first protective passivation layer on a side of the thin film transistor close to the opposite substrate, an organic film layer on a side of the first protective passivation layer close to the opposite substrate, and a second protective passivation layer on a side of the organic film layer close to the opposite substrate, wherein a permeability of an exhaust gas of the organic film layer to the second protective passivation layer is higher than that to the first protective passivation layer, wherein an orthographic projection of the second protective passivation layer on the substrate layer extends to the outer region, and wherein the display panel further comprises a water insulation layer, which covers a portion of the second protective passivation layer where its orthographic projection on the substrate layer is in the outer region, such that the second protective passivation layer is not in contact with an external environment of the display panel.

Optionally, the thin film transistor comprises an oxide thin film transistor.

Optionally, the display panel further comprises a pixel electrode layer on a side of the second protective passivation layer close to the opposite substrate in the active display area, and the water insulation layer and the pixel electrode layer are disposed in the same layer.

Optionally, a material of the water insulation layer comprises indium tin oxide.

Optionally, the water insulation layer extends to an interior of the display panel through a gap between the second protective passivation layer and the frame sealant, such that an orthographic projection of the water insulation layer on the substrate layer extends to the inner region.

Optionally, the water insulation layer covers portions of all layers of the array substrate except the substrate layer where their orthographic projections on the substrate layer are in the outer region, such that all layer of the array substrate other than the substrate layer are not in contact with the external environment of the display panel.

Optionally, an outer edge of an orthographic projection of the water insulation layer on the substrate layer is located in the outer region and keeps a distance from an edge of the display panel, wherein the distance is not zero.

Optionally, an orthographic projection of the water insulation layer on the substrate layer covers the entire outer region.

Optionally, the display panel further comprises a pixel electrode layer on a side of the second protective passivation layer close to the opposite substrate in the active display area, and the water insulation layer and the pixel electrode layer are disposed in the same layer, and the display panel further comprises a via hole conductive medium layer disposed in the same layer as the pixel electrode layer and the water insulation layer, and the water insulation layer is separated from the via hole conductive medium layer.

In another aspect, the present disclosure provides a method for preparing the display panel described above, comprising following steps:

after forming the second protective passivation layer, forming the pixel electrode layer and the water insulation layer simultaneously by a mask deposition process, and after forming the water insulation layer, bonding the array substrate and the opposite substrate with a frame sealant.

Optionally, before forming the water insulation layer by the mask deposition process, a predetermined frame sealant region is set;

an inner edge of an orthographic projection of the water insulation layer formed by the mask deposition process on the substrate layer is inside an inner edge of an orthographic projection of the predetermined frame sealant region on the substrate layer and keeps a distance of 1.8 μm or more from the inner edge of the orthographic projection of the predetermined frame sealant region on the substrate layer, and a frame sealant is applied in the predetermined frame sealant region to bonding the array substrate and the opposite substrate with the frame sealant.

DETAILED DESCRIPTION

There is a need to reduce or prevent the effect of outgassing for the thin film transistors comprising components susceptible to damage by the exhaust gas of the organic film in the display panel. The components susceptible to damage by the exhaust gas of the organic film may be any component of the thin film transistor, such as an active layer. For example, in a display panel based on an oxide thin film transistor array substrate, the exhaust gas produced in the organic film layer on a side of the oxide semiconductor active layer close to the opposite substrate may permeate into and interact with the oxide semiconductor active layer, thereby adversely influencing the performances of the oxide thin film transistor severely. In this regard, the exhaust gas may be directed away from the oxide semiconductor active layer of the oxide thin film transistor by providing different environments on the both sides of the exhaust gas-producing organic film layer respectively.

Figure 1:
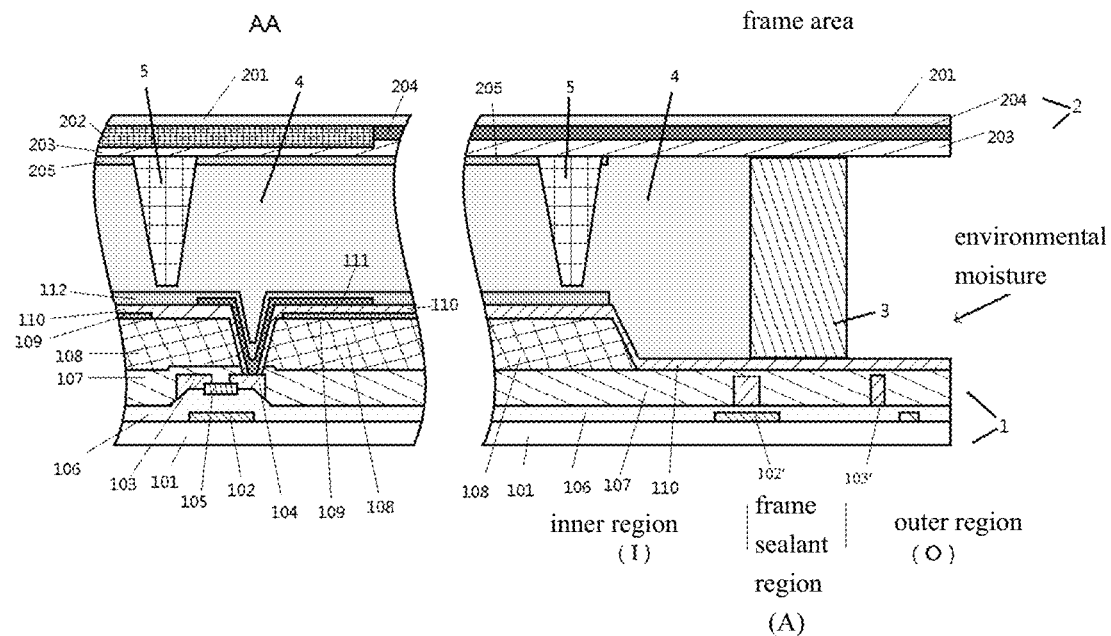
FIG. 1 is a schematic cross-sectional view illustrating a solution for solving an outgassing problem.

FIG. 1 schematically shows a solution for solving the outgassing problem. FIG. 1 shows a schematic section view of a liquid crystal display panel. In this figure, 1 represents an array substrate, 2 represents an opposite substrate, 3 represents a frame sealant for bonding the array substrate and the opposite substrate, and 4 represents a liquid crystal layer, which is sealed by the array substrate 1, the opposite substrate 2 and the frame sealant 3. The liquid crystal display panel further comprises a spacer 5. The frame sealant surrounds the entire periphery of the display panel for bonding in the frame area, and serves for preventing the intrusion of external environment water.

FIG. 1 schematically shows a section view of the frame area and the active display area (AA) of the display panel, wherein the left part schematically shows a TFT in the AA and a layered structure around the pixel corresponding thereto in the AA, and the right part schematically shows the layered structure at the frame area of the display panel. The parts between the left and right parts are omitted. In this figure, film layers respectively formed in the same layer in the AA area and in the frame area are represented by the same pattern. In the omitted parts, these film layers may be continuous or discontinuous.

A projection of the frame sealant on the array substrate may divide the frame area into an inner region (I), a frame sealant region (A), and an outer region (O).

The array substrate 1 comprises a substrate layer 101. In the AA, an oxide thin film transistor is schematically shown. The structure of the oxide thin film transistor may comprise source/drain electrodes, a gate electrode, a gate electrode insulating layer, an active layer, an interlayer dielectric layer, and the like. In the oxide thin film transistor as shown in this figure, a gate electrode 102, source/drain electrodes 103/104, an active layer 105, a gate electrode insulating layer 106, and a first protective passivation layer 107 are provided on a side of the substrate layer 101 close to the opposite substrate 2. The active layer 105 is an oxide semiconductor active layer. In FIG. 1, there may be a gate electrode 102 and a gate electrode insulating layer 106 between the active layer 105 and substrate layer 101. A first protective passivation layer 107 is provided on a side of the active layer 105 close to the opposite substrate 2. An organic film layer 108 is provided on a side of the first protective passivation layer 107 close to the opposite substrate 2. The function of the organic film layer 108 in the oxide thin film transistor liquid crystal display panel is to reduce the data cable-common electrode capacitance, increase the aperture ratio of the array substrate, and reduce the power consumption. The organic film layer may be, for example, an acrylic epoxy resin layer. A common electrode 109 is provided on a side of the organic film layer 108 close to the opposite substrate 2. The problem of outgassing will occur in the organic film layer 108, and the exhaust gas may permeate through the first protective passivation layer 107 to influence the active layer 105. In this regard, a second protective passivation layer 110 is provided on the other side of the organic film layer 108, such that a permeability of the exhaust gas of the organic film layer 108 to the second protective passivation layer 110 is higher than that to the first protective passivation layer 107. In this regard, a material which is less dense than the material for the first protective passivation layer 107 may be selected. At this time, the exhaust gas released form the organic film layer 108 will permeate into the second protective passivation layer 110 rather than to the first protective passivation layer 107, so that the oxide active layer 105 may be protected from the exhaust gas. Although FIG. 1 only shows one oxide TFT, it will be appreciated that, for example, both of the first protective passivation layer 107 and the second protective passivation layer 110 may extend in the entire display panel, such that oxide thin film transistors in the AA which are not shown in FIG. 1 may also be protected. Further, as described below, the first protective passivation layer 107 and the second protective passivation layer 110 extend to the frame of the display panel as well, until the ends thereof are exposed in the environment. There may also be other film layers, which are not limited in the present disclosure. A pixel electrode 111 is further provided on the array substrate for making the liquid crystal layer emit light. An alignment layer 112 for orienting liquid crystals may be further provided on the array substrate. The alignment layer may be made of polyimide, for example.

The opposite substrate 2 in FIG. 1 is a color filter substrate, wherein 201 represents a glass substrate, 202 represents a color filter layer, 203 represents an optical transparent layer, and 204 represents a black matrix. Here, the color filter layer 202 may be provided at pixels in the AA area only for emitting light, while the black matrix 204 may be provided both at the border of the color filter layer and in the frame area, and the black matrix in the frame area and the black matrix in the AA area may be disposed in the same layer. An alignment layer 205 for orienting liquid crystals may also be provided on the opposite substrate 2. The alignment layer 205 may be prepared from the same material as the alignment layer 112, or from a different material. In the exemplary embodiment of FIG. 1, the alignment layer 205 is prepared from the same material as the alignment layer 112, and is represented by the same pattern.

Between the array substrate 1 and the opposite substrate 2, a liquid crystal layer 4 is provided, and a spacer 5 is further provided.

In the frame area as shown in the right part of FIG. 1, the frame sealant 3 bonds and seals the array substrate 1 and the opposite substrate 2, and seals the liquid crystal layer 4 in the display panel. According to an orthographic projection of the frame sealant 3 on the array substrate 1, the frame area may be divided into a frame sealant region A in which the orthographic projection of the frame sealant is located, an outer region O on a side of the frame sealant A close to the external environment, and an inner region I on a side of the frame sealant region A close to the AA. The ends of the gate electrode insulating layer 106, the first protective passivation layer 107 and the second protective passivation layer 110 all extend to the outer region O and are in contact with the external environment, that is, they may be in contact with environmental moisture. There are also components formed in the same layer as the gate electrode and the source/drain electrodes respectively in the frame area, such as metal wires 102', 103', which may be a dummy electrode, a date cable or the like. It should be noted that the positions of these components are only exemplary.

The embodiment of FIG. 1 has a drawback that the second protective passivation layer 110 is in direct contact with the external environment of the display panel, because it extends on the entire array substrate to the outside of the region sealed by the frame sealant 3. Because the second protective passivation layer 110 is less dense, it is not sufficient to prevent the permeation of environmental moisture under in high humidity atmosphere, and thus a moisture transport passage for the environmental moisture to enter the interior of the frame sealant sealed region is formed, thereby resulting in deterioration of the performances of the display panel.

The present disclosure provides a thin film transistor liquid crystal display panel having an active display area and a frame area, comprising:

an array substrate and an opposite substrate opposite to the array substrate, wherein the array substrate comprises a substrate layer and a thin film transistor on a side of the substrate layer close to the opposite substrate; and a frame sealant for bonding the array substrate and the opposite substrate in the frame area, wherein an orthographic projection of the frame sealant on the substrate layer divides the frame area into an inner region surrounded by the orthographic projection of the frame sealant, a frame sealant region in which the orthographic projection of the frame sealant is located, and an outer region outside the orthographic projection of the frame sealant, wherein the display panel further comprises a first protective passivation layer on a side of the thin film transistor close to the opposite substrate, an organic film layer on a side of the first protective passivation layer close to the opposite substrate, and a second protective passivation layer on a side of the organic film layer close to the opposite substrate, wherein a permeability of an exhaust gas of the organic film layer to the second protective passivation layer is higher than that to the first protective passivation layer, wherein an orthographic projection of the second protective passivation layer on the substrate layer extends to the outer region, and wherein the display panel further comprises a water insulation layer, which covers a portion of the second protective passivation layer where its orthographic projection on the substrate layer is in the outer region, such that the second protective passivation layer is not in contact with an external environment of the display panel.

A water insulation layer is added in the display panel of the present disclosure to solve the problem that the second protective passivation layer is exposed to environmental moisture.

The thin film transistor liquid crystal display panel of the present disclosure has an active display area and a frame area. The active display area (active area) and the frame area are terms commonly known in the art. The display panel of the present disclosure comprises an array substrate and an opposite substrate opposite to the array substrate, and they are bonded with a frame sealant.

The array substrate comprises a substrate layer and a plurality of film layers and components provided on the substrate layer. In the display panel, the thin film transistor of the array substrate is provided on a side of the substrate layer close to the opposite substrate, or between the substrate layer and the opposite substrate. The opposite substrate may be a color filter substrate, for example.

The embodiment where the frame sealant bonds the array substrate and the opposite substrate is well known in the art. The frame sealant is located in the frame area on the periphery of the display panel, without influencing the display. The frame sealant bonds and fixes the array substrate and the opposite substrate, while sealing the space between these two substrates for accommodating liquid crystals, and preventing water in the environment from entering. There may also be a desired film layer or component between the opposite substrate and the array substrate. For example, when the display panel is a liquid crystal display panel and the opposite substrate is a color filter substrate, there may also be a liquid crystal layer between the array substrate and the opposite substrate.

Figure 2:
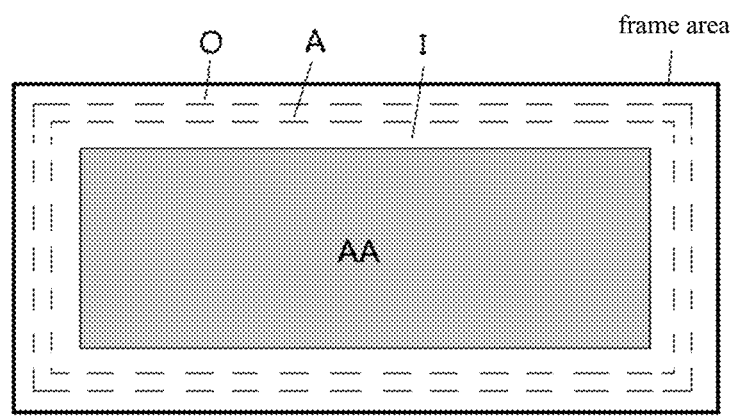
FIG. 2 is a schematic plan view showing divided regions of the frame area.

Viewing from the orthographic projection in the substrate layer, the frame sealant divides the frame area into three regions: an inner region surrounded by the orthographic projection of the frame sealant, a frame sealant region in which the orthographic projection of the frame sealant is located, and an outer region outside the orthographic projection of the frame sealant. FIG. 2 schematically shows divided regions of the frame area according to the orthographic projection of the frame sealant on the substrate layer. In the rectangular display panel, the central gray part is a projection region of the active display area AA, and the periphery is a projection region of the frame area. When the frame sealant 3 forms an annular band with a certain width, its projection is the frame sealant region A. The portion inside the frame sealant region A is an inner region I, and the portion outside the frame sealant region A is an outer region O. For clarity, the dimensions in FIG. 2 are not drawn according to actual scale.

The thin film transistor of the present disclosure comprises source/drain electrodes, a gate electrode, a gate electrode insulating layer and an active layer as basic components of a transistor. A first protective passivation layer, an organic film layer and a second protective passivation layer are provided on a side of the thin film transistor close to the opposite substrate. The thin film transistor of the present disclosure comprises an organic film layer substantially sandwiched between the first protective passivation layer and the second protective passivation layer. A permeability of an exhaust gas of the organic film layer to the second protective passivation layer is higher than that to the first protective passivation layer. Thus, the exhaust gas will not permeate towards the thin film transistor, but will permeate towards the second protective passivation layer.

The second protective passivation layer spreads throughout the entire display panel, and extends to the outside of the frame sealant. Therefore, its orthographic projection extends to the outer region.

The display panel of the present disclosure comprises a water insulation layer, which covers a portion of the second protective passivation layer where its orthographic projection on the substrate layer is in the outer region, such that the second protective passivation layer is not in contact with an external environment of the display panel.

The present disclosure solves the above problem of the moisture transport passage in communication with the environment due to the presence of the second protective passivation layer for preventing the exhaust gas from damaging the thin film transistor by providing a water insulation layer.

Figure 3:
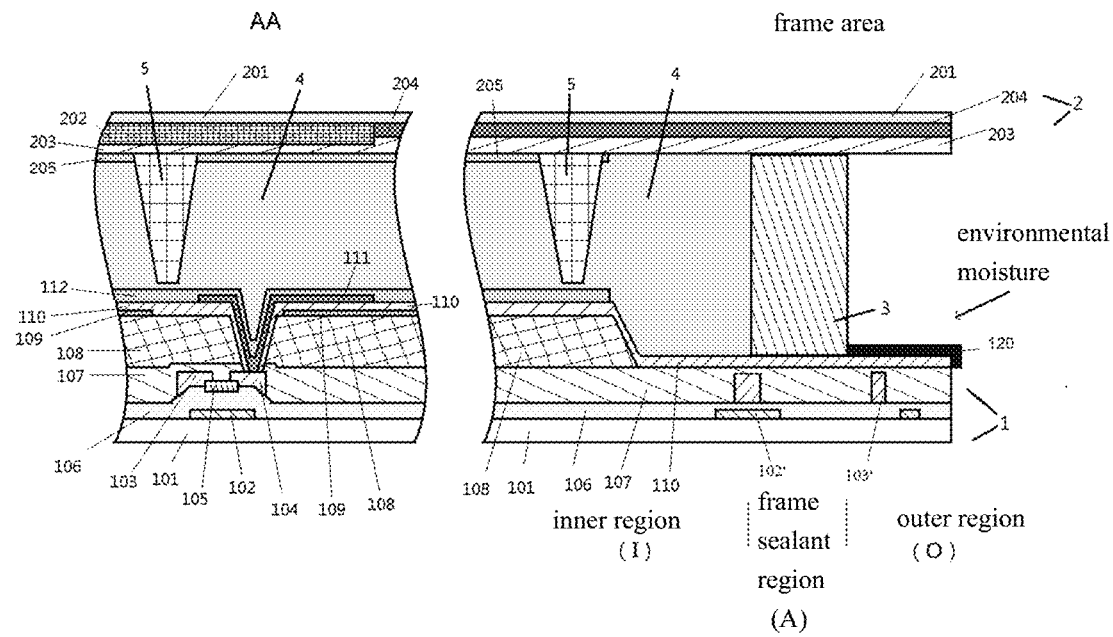
FIG. 3 is a schematic cross-sectional view of an embodiment of the present disclosure.

FIG. 3 schematically shows an embodiment of the present disclosure.

In FIG. 3, 1 represents an array substrate, 2 represents an opposite substrate, 3 represents a frame sealant for bonding the array substrate and the opposite substrate, and 4 represents a liquid crystal layer, which is sealed by the array substrate 1, the opposite substrate 2 and the frame sealant 3. The liquid crystal display panel further comprises a spacer 5. The frame sealant surrounds the entire periphery of the display panel for bonding in the frame area, and serves for preventing the intrusion of external environment water.

FIG. 3 schematically shows a section view of the frame area and the active display area (AA) of the display panel, wherein the left part schematically shows a TFT in the AA and a layered structure around the pixel corresponding thereto in the AA, and the right part schematically shows the layered structure at the frame area of the display panel. The parts between the left and right parts are omitted. In this figure, film layers respectively formed in the same layer in the AA area and in the frame area are represented by the same pattern. In the omitted parts, these film layers may be continuous or discontinuous.

A projection of the frame sealant on the array substrate may divide the frame area into an inner region (I), a frame sealant region (A), and an outer region (O).

The array substrate 1 comprises a substrate layer 101. In the AA, an oxide thin film transistor is schematically shown. In the exemplary embodiments of the present disclosure, an oxide thin film transistor is illustrated as an example, and the second protective passivation layer therein is used for protecting the oxide active layer from being influenced by the exhaust gas of the organic film layer. However, it may be appreciated that the structure of the present disclosure may also be used for other types of thin film transistor liquid crystal display panels to prevent the exhaust gas from influencing the performances of the thin film transistors, while preventing moisture from entering into the interior of the display panel under harsh conditions. The structure of the oxide thin film transistor may comprise source/drain electrodes, a gate electrode, a gate electrode insulating layer, an oxide semiconductor active layer, an appropriate interlayer dielectric layer, and the like. In the oxide thin film transistor as shown in this figure, a gate electrode 102, source/drain electrodes 103/104, an active layer 105, a gate electrode insulating layer 106, and a first protective passivation layer 107 are provided on a side of the substrate layer 101 close to the opposite substrate 2. The active layer 105 is an oxide semiconductor active layer. In FIG. 3, there may be a gate electrode 102 and a gate electrode insulating layer 106 between the active layer 105 and substrate layer 101. A first protective passivation layer 107 is provided on a side of the active layer 105 close to the opposite substrate 2. An organic film layer 108 is provided on a side of the first protective passivation layer 107 close to the opposite substrate 2. The function of the organic film layer 108 in the oxide thin film transistor liquid crystal display panel is to reduce the data cable-common electrode capacitance, increase the aperture ratio of the array substrate, and reduce the power consumption. The organic film layer may be, for example, an acrylic epoxy resin layer. A common electrode 109 is provided on a side of the organic film layer 108 close to the opposite substrate 2. The problem of outgassing will occur in the organic film layer 108, and the exhaust gas may permeate through the first protective passivation layer 107 to influence the active layer 105. In this regard, a second protective passivation layer 110 is provided on the other side of the organic film layer 108, such that a permeability of the exhaust gas of the organic film layer 108 to the second protective passivation layer 110 is higher than that to the first protective passivation layer 107. In this regard, a material which is less dense than the material for the first protective passivation layer 107 may be selected. Other than using a less dense material, other suitable means may also be used to provide a second protective passivation layer having a higher gas permeability. For example, a material having micro gas permeation passages or having a component which facilitates gas diffusion may be used to form the second protective passivation layer. At this time, the exhaust gas released form the organic film layer 108 will permeate into the second protective passivation layer 110 rather than to the first protective passivation layer 107, so that the oxide active layer 105 may be protected from the exhaust gas. Although FIG. 3 only shows one TFT, it will be appreciated that, for example, both of the first protective passivation layer 107 and the second protective passivation layer 110 may extend in the entire display panel, such that thin film transistors in the AA which are not shown in FIG. 3 may also be protected. Further, as described below, the first protective passivation layer 107 and the second protective passivation layer 110 extend to the frame of the display panel as well, until the ends thereof are exposed in the environment. There may also be other film layers, which are not limited in the present disclosure. A pixel electrode 111 is further provided on the array substrate for making the liquid crystal layer emit light. An alignment layer 112 for orienting liquid crystals may be further provided on the array substrate. The alignment layer may be made of polyimide, for example.

The opposite substrate 2 in FIG. 3 is a color filter substrate, wherein 201 represents a glass substrate, 202 represents a color filter layer, 203 represents an optical transparent layer, and 204 represents a black matrix. Here, the color filter layer 202 may only be provided at pixels in the AA area only for emitting light, while the black matrix 204 may be provided both at the border of the color filter layer, and in the frame area, and the black matrix in the frame area and the black matrix in the AA area may be disposed in the same layer. An alignment layer 205 for orienting liquid crystals may also be provided on the opposite substrate 2. The alignment layer 205 may be prepared from the same material as the alignment layer 112, or from a different material. In the exemplary embodiment of FIG. 3, the alignment layer 205 is prepared from the same material as the alignment layer 112, and is represented by the same pattern.

Between the array substrate 1 and the opposite substrate 2, a liquid crystal layer 4 is provided, and a spacer 5 is further provided.

In the frame area as shown in the right part of FIG. 3, the frame sealant 3 bonds and seals the array substrate 1 and the opposite substrate 2, and seals the liquid crystal layer 4 in the display panel. According to an orthographic projection of the frame sealant 3 on the array substrate 1, the frame area may be divided into a frame sealant region A in which the orthographic projection of the frame sealant is located, an outer region O on a side of the frame sealant A close to the external environment, and an inner region I on a side of the frame sealant region A close to the AA. The ends of the gate electrode insulating layer 106, the first protective passivation layer 107 and the second protective passivation layer 110 all extend to the outer region O and are in contact with the external environment, that is, they may be in contact with environmental moisture. The organic film layer 108 does not extend to the outer region, and is terminated before reaching the frame sealant region. At the position where the organic film layer 108 is terminated, the first protective passivation layer 107 and the second protective passivation layer 110 converge and are in contact with each other. There are also components formed in the same layer as the gate electrode and the source/drain electrodes respectively in the frame area, such as metal wires 102', 103', which may be a dummy electrode, a date cable or the like. It should be noted that the positions of these components are only exemplary.

Specifically, in the AA area of the display panel, a gate electrode layer 102 is provided on a side of the substrate layer 101 of the array substrate, a gate electrode insulating layer 106 is provided on a side of the gate electrode layer 102 away from the substrate layer 101, and an oxide semiconductor active layer 105 is provided on a side of the gate electrode insulating layer 106 away from the substrate layer 101, wherein an orthographic projection of the oxide semiconductor active layer 105 on the substrate layer 101 is overlapped with an orthographic projection of the gate electrode layer 102. In the present disclosure, overlapping may include partial overlapping. Source/drain electrodes 103/104 electrically connected to the oxide semiconductor active layer 105 are provided. The first protective passivation layer 107 covers the active layer 105 and the source/drain electrodes 103/104 on a side away from the substrate layer 101. An organic film layer 108 is provided on a side of the first protective passivation layer 107 away from the substrate layer 101. A common electrode 109 is provided partially on a side of the organic film layer 108 away from the substrate layer 101, and a second protective passivation layer 110 is provided on a side of the common electrode 109 and the organic film layer 108 away from the substrate layer 101. The organic film layer 108 is in contact with both the second protective passivation layer 110 and the first protective passivation layer 107. A pixel electrode layer 111 is provided on a side of the second protective passivation layer 110 away from the substrate layer 101, and an orthographic projection of the pixel electrode layer 111 on the substrate layer 101 is overlapped with an orthographic projection of the common electrode 109 on the substrate layer 101. A first alignment layer 112 is provided in a region outside the pixel electrode layer 111. A liquid crystal layer 4 is provided on a side of the pixel electrode layer 111 away from the substrate layer 101, and a second alignment layer 205, an optical transparent layer 203, a color filter layer 202, a black matrix 204, a glass substrate 201 and the like are further provided. A spacer 5 is provided in the liquid crystal layer 4.

Specifically, a frame sealant 3 is provided in the frame area, which bonds the array substrate 1 and the opposite substrate 2, and seals the liquid crystal layer 4 in the display panel. An orthographic projection of the frame sealant 3 on the substrate layer divides the frame area into a frame sealant region A, an inner region I and an outer region O.

The array substrate 1 comprises a substrate layer 101. A gate electrode insulating layer 106 is provided on a side of substrate layer close to opposite substrate 2, and is disposed in the same layer as the gate electrode insulating layer 106 in the AA area. A first protective passivation layer 107 is provided on a side of the gate electrode insulating layer 106 close to opposite substrate 2, and is disposed in the same layer as the first protective passivation layer 107 in the AA area. A second protective passivation layer 110 is provided on a side of the first protective passivation layer 107 close to opposite substrate 2, and is disposed in the same layer as the second protective passivation layer 110 in the AA area. In the inner region I of the frame area, an organic film layer 108 may also be provided between the first protective passivation layer 107 and the second protective passivation layer 110, and may be disposed in the same layer as the organic film layer 108 in the AA area. All the material layers disposed in the same layers as the gate electrode insulating layer 106, the first protective passivation layer 107 and the second protective passivation layer 110 extend to the outside of the region sealed by the frame sealant 3. That is, orthographic projections of them on the substrate layer 101 extend into the outer region O.

In the inner region I, a first alignment layer 112 is further provided on a side of the second protective passivation layer 110 close to opposite substrate 2, and it may be a polyimide layer.

A liquid crystal layer 4 is provided between the array substrate 1 and the opposite substrate 2, and is confined in the display panel by the frame sealant 3.

The opposite substrate comprises a substrate 201, a black matrix 204 on a side of the substrate 201 close to the array substrate 1, and an optical transparent layer 203 on a side of the black matrix close to the array substrate 1, and orthographic projections of them on the substrate layer 101 extend to the outer region O. In the inner region I, a second alignment layer 205 is further provided on a side of the optical transparent layer 203 close to the array substrate 1, and it may be a polyimide layer. The liquid crystals in the liquid crystal layer 3 may be oriented by the first alignment layer 112 and/or the second alignment layer 205. In addition, a spacer 5 is further attached to a side of the opposite substrate 2 close to the array substrate 1. It may be appreciated that the spacer may also be provided on a side of the array substrate 1 close to the opposite substrate.

In the array substrate of the frame area, there may also be components 102', 103' formed in the same layer as the gate electrode and the source/drain electrodes respectively, and the positions of them are exemplary. They may be used to form a data cable, a dummy electrode or the like.

In FIG. 3, a water insulation layer 120 is provided, which covers a portion in the outer region O of the orthographic projection of the second protective passivation layer 110 on the substrate layer 101. That is, it completely covers a portion of the second protective passivation layer 110 outside the frame sealant to avoid the contact between the second protective passivation layer 110 and environmental moisture and prevent the loose second protective passivation layer 110 from forming a transport passage into the interior of the panel, such that the entrance of moisture may be prevented even under a high temperature, high pressure and high humidity condition. In FIG. 3, the water insulation layer 120 extends from the outside of the frame sealant to an edge of the display panel, and also extends towards the substrate layer 101, thereby completely covering the lateral end surface of the second protective passivation layer 110. In the present disclosure, a lateral direction means a direction parallel to the substrate layer.

By providing the water insulation layer 120, the embodiment of the present disclosure as shown in FIG. 3 completely separates the second protective passivation layer 110 outside the frame sealant from environmental moisture, thereby avoiding the deterioration of the display panel due to the entrance of water under a high temperature, high pressure and high humidity condition.

It should be appreciated that in the present disclosure, various film layers of the display device in the active display area in the left part of this figure may also be arranged in other forms, as long as there are an organic film layer and first and second protective passivation layers in contact therewith meeting the requirements of the present disclosure. For example, the common electrode may also be located on a side of the opposite substrate facing the array substrate. This also applies to the embodiments as shown in other figures.

In an embodiment, the thin film transistor comprises an oxide thin film transistor. The oxide thin film transistor comprises an oxide semiconductor active layer. The structure of the present disclosure is particularly suitable for an oxide thin film transistor liquid crystal display panel, and it may sufficiently protect the oxide semiconductor active layer therein from the exhaust gas of the organic film layer.

In an embodiment, an outer edge of an orthographic projection of the water insulation layer on the substrate layer is located in the outer region and keeps a distance from an edge of the display panel, wherein the distance is not zero. That is, the outer edge of the orthographic projection of the water insulation layer on the substrate layer is inside the edge of the substrate layer.

Figure 4:
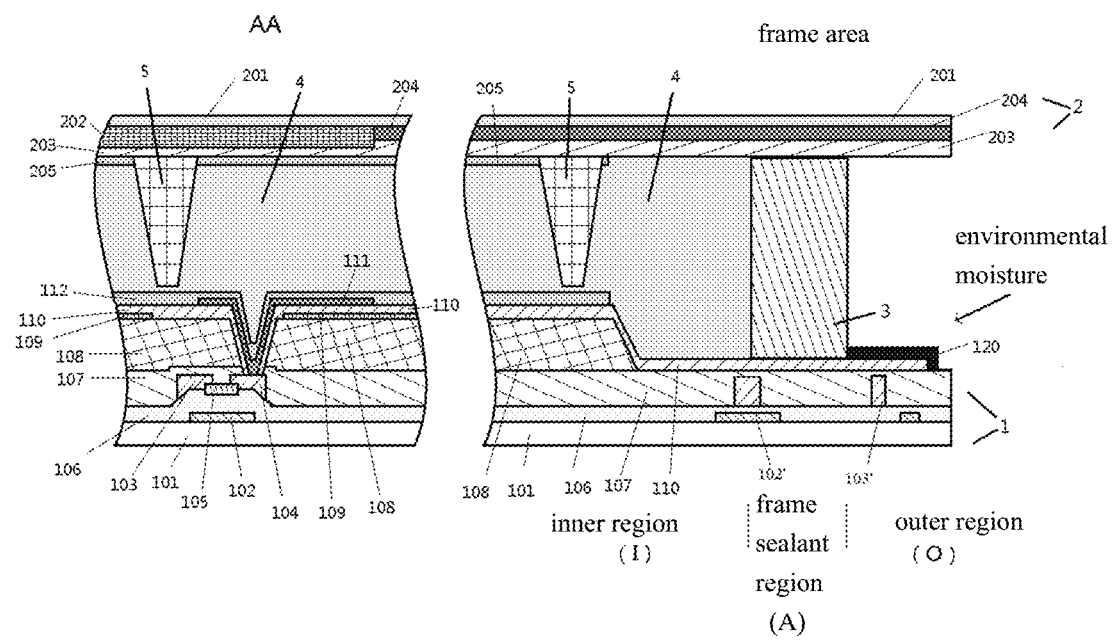
FIG. 4 is a schematic cross-sectional view of another embodiment of the present disclosure.

FIG. 4 schematically shows another embodiment of the present disclosure. In this figure, reference numbers the same as in FIG. 3 represent the same structures. As compared to FIG. 3, the second protective passivation layer 110 in FIG. 4 does not extend to an edge of the display panel. In other words, an orthographic projection of the second protective passivation layer 110 on the substrate layer 101 does not extend to an edge of the substrate layer. Therefore, an orthographic projection of an outer edge of the water insulation layer 120 on the substrate layer 101 may be inside the edge of the substrate layer 101. Such a structure is easier to form than that in FIG. 3, and has a robust structure, because the water insulation layer 120 covering the lateral end surface of the second protective passivation layer 110 in FIG. 3 cannot be easily formed by a deposition process, and the end surface thereof close to the substrate layer 101 is a free end and thus is less robust.

In an embodiment, the orthographic projection of the water insulation layer on the substrate layer covers the entire outer region.

Figure 5:
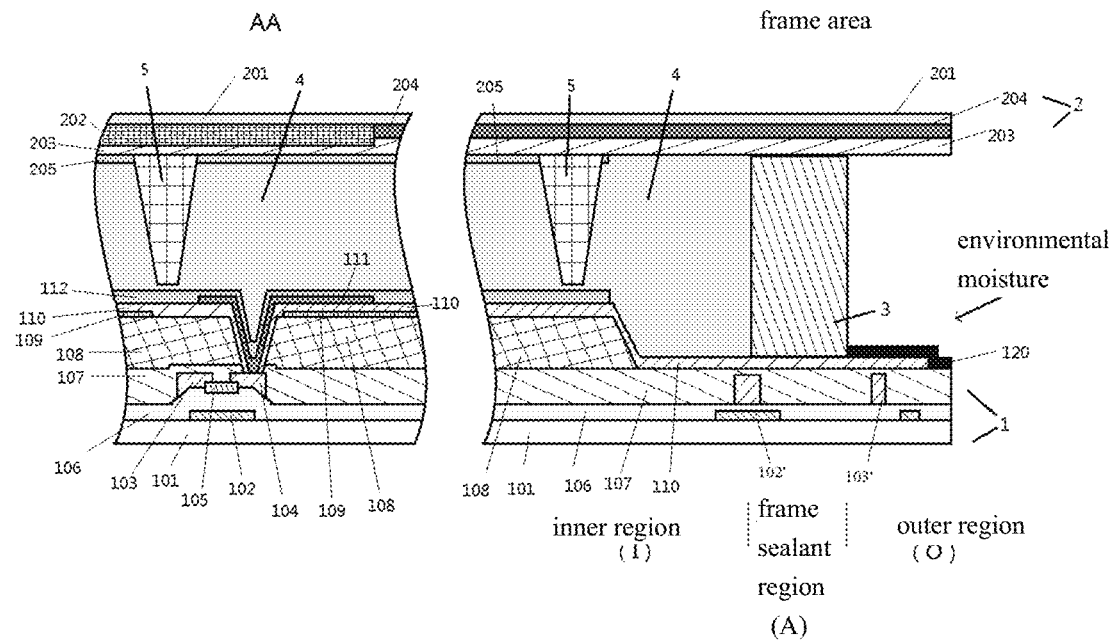
FIG. 5 is a schematic cross-sectional view of yet another embodiment of the present disclosure.

FIG. 5 schematically shows yet another embodiment of the present disclosure. In this figure, reference numbers the same as in FIG. 4 represent the same structures. The second protective passivation layer 110 of FIG. 5 does not extend to an edge of the display panel, either. As compared to FIG. 4, an orthographic projection of an edge of the water insulation layer 120 on the substrate layer 101 in FIG. 5 may reach an edge of the substrate layer 101, i.e., cover the entire outer region O. Such a structure is easier to form than that in FIG. 4, because it is not necessary to specifically control the distance between the edge of the water insulation layer and the edge of the display panel, thereby simplifying the mask and deposition process.

In an embodiment, the water insulation layer covers portions of all layers of the array substrate except the substrate layer where their orthographic projections on the substrate layer are in the outer region, such that all layer of the array substrate other than the substrate layer are not in contact with the external environment of the display panel.

Figure 6:
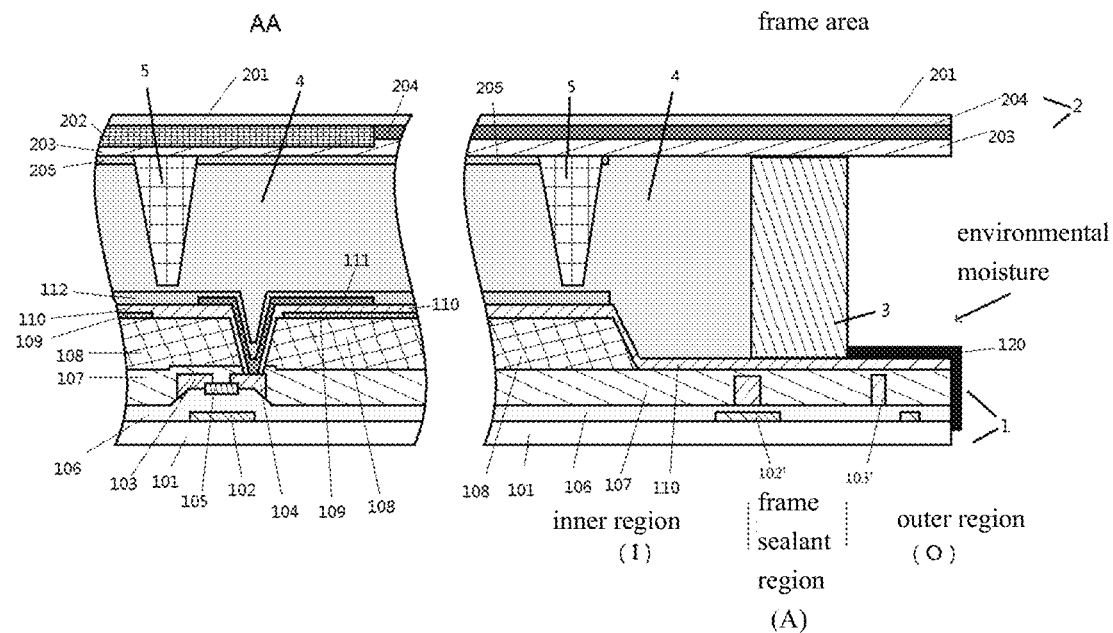
FIG. 6 is a schematic cross-sectional view of yet another embodiment of the present disclosure.

FIG. 6 schematically shows yet another embodiment of the present disclosure. In this figure, reference numbers the same as in FIG. 3 represent the same structures. As compared to FIG. 3, the water insulation layer 120 not only covers the second protective passivation layer 110, but also completely covers all layers of the array substrate except the substrate layer 101, such as the first protective passivation layer 107 and the gate electrode insulating layer 106. Such a structure may further seal the other layers of the array substrate therein, thereby further enhancing the water resistance of the display panel under harsh conditions. Such an embodiment does not need to accurately define the border of the water insulation layer below the lateral end surface of the array substrate, thereby simplifying the preparation process. The substrate layer 101 is waterproof, and is, for example, a glass substrate. Therefore, there is no need to cover its lateral end surface with the water insulation layer 120. Nevertheless, as shown in FIG. 6, the lateral end surface of the substrate layer may also be partially covered by the water insulation layer 120. Also, the lateral end surface of the substrate layer may also be completely covered by the water insulation layer 120.

Figure 7:
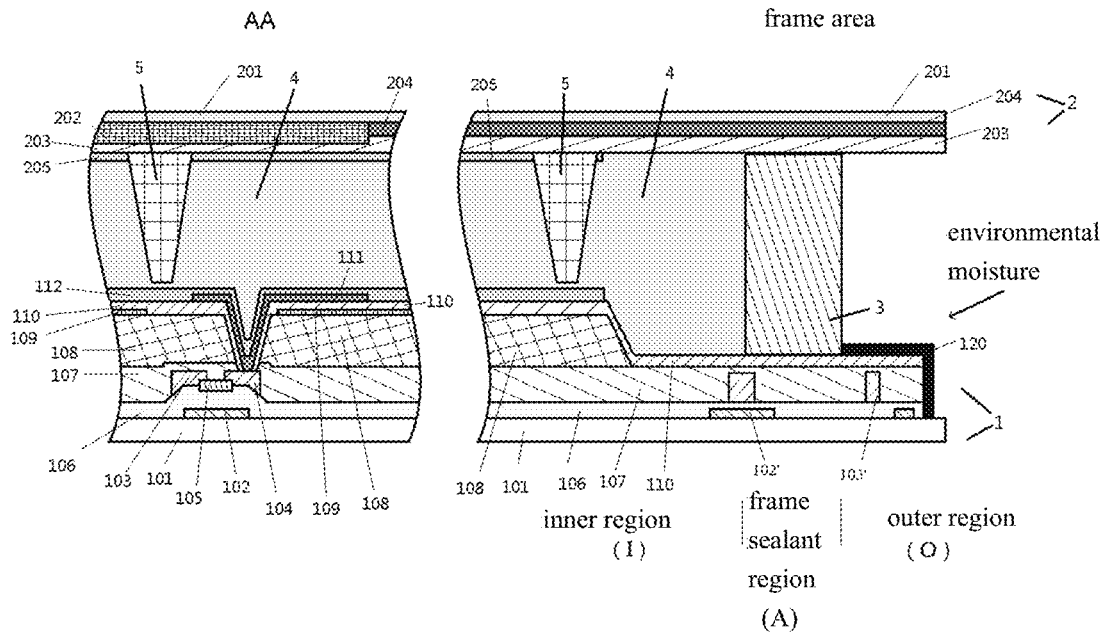
FIG. 7 is a schematic cross-sectional view of yet another embodiment of the present disclosure.

FIG. 7 schematically shows yet another embodiment of the present disclosure. In this figure, reference numbers the same as in FIG. 6 represent the same structures. As compared to FIG. 6, none of the second protective passivation layer 110, the first protective passivation layer 107 and the gate electrode insulating layer 106 in FIG. 7 extends to an edge of the display panel. In other words, none of orthographic projections of the second protective passivation layer 110, the first protective passivation layer 107 and the gate electrode insulating layer 106 on the substrate layer 101 extends to an edge of the substrate layer. Therefore, an orthographic projection of an outer edge of the water insulation layer 120 on the substrate layer 101 may be inside the edge of the substrate layer 101. Such a structure is easier to form than that in FIG. 6, and has a robust structure, because the water insulation layer 120 covering the lateral end surface of the second protective passivation layer 110 in FIG. 6 cannot be easily formed by a deposition process, and the end surface thereof close to the substrate layer 101 is a free end and thus is less robust.

Figure 8:
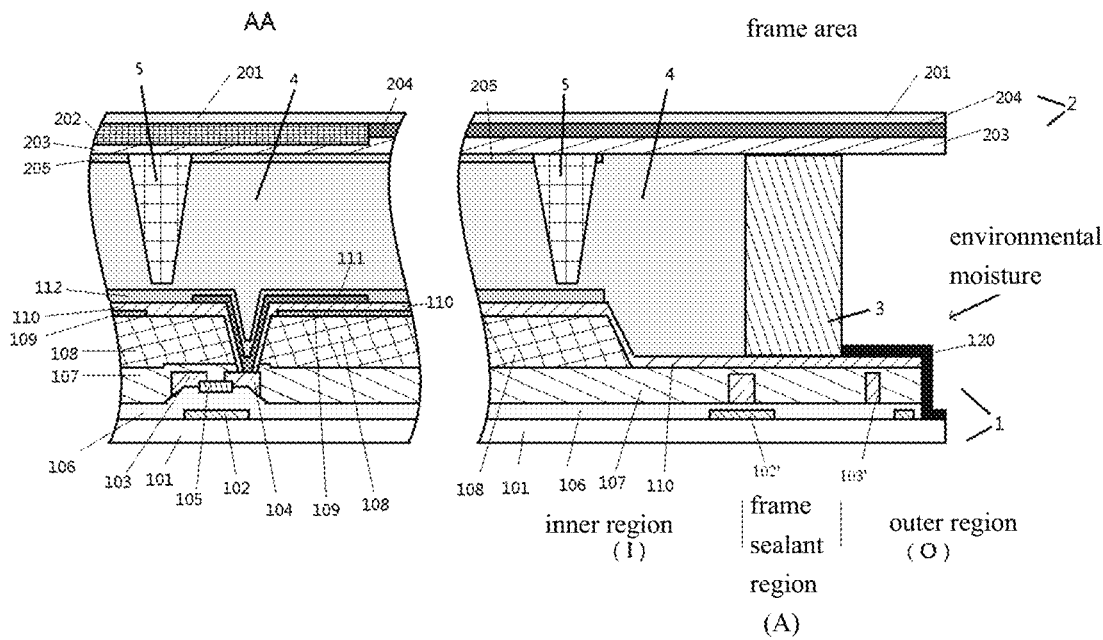
FIG. 8 is a schematic cross-sectional view of yet another embodiment of the present disclosure.

FIG. 8 schematically shows yet another embodiment of the present disclosure. In this figure, reference numbers the same as in FIG. 7 represent the same structures. None of the second protective passivation layer 110, the first protective passivation layer 107 and the gate electrode insulating layer 106 in FIG. 8 extends to an edge of the display panel as well. As compared to FIG. 7, an orthographic projection of an edge of the water insulation layer 120 on the substrate layer 101 in FIG. 8 may reach an edge of the substrate layer 101, i.e., cover the entire outer region O. Such a structure is easier to form than that in FIG. 7, because it is not necessary to specifically control the distance between the edge of the water insulation layer and the edge of the display panel, thereby simplifying the mask and deposition process.

It should be appreciated that in the display panel of the present disclosure, similar to the embodiments as shown in FIG. 6-FIG. 8, the shape of the outer edge of the water insulation layer 120 may be adjusted as appropriate to suitably fit with particular second protective passivation layer 110, first protective passivation layer 107, gate electrode insulating layer 106 and any other film layer on the substrate layer 101 of the array substrate 1 which extends to the outside of the frame sealant 3. The water insulation layer 120 may also cover only a portion of the above film layers, for example, cover only the second protective passivation layer 110 and the first protective passivation layer 103, but not the gate electrode insulating layer 106.

In the embodiments as shown in FIGS. 2-8, there is one potential problem that the bonding of the array substrate and the opposite substrate is usually performed after forming the water insulation layer 120. Thus, if the water insulation layer is designed to only extend to the outer surface of the frame sealant, a gap may remain between the water insulation layer and the frame sealant due to the error of gluing accuracy, such that it is difficult to ensure the sealing between the frame sealant 3 and the water insulation layer 120. Also, even if the frame sealant region is accurately formed at the inner edge of the water insulation layer 120, or covers the inner edge of the water insulation layer a bit, there may be potential water intrusion path at the shorter interface therebetween.

In an embodiment, the water insulation layer extends to an interior of the display panel through a gap between the second protective passivation layer and the frame sealant, such that an orthographic projection of the water insulation layer on the substrate layer extends to the inner region.

Figure 9:
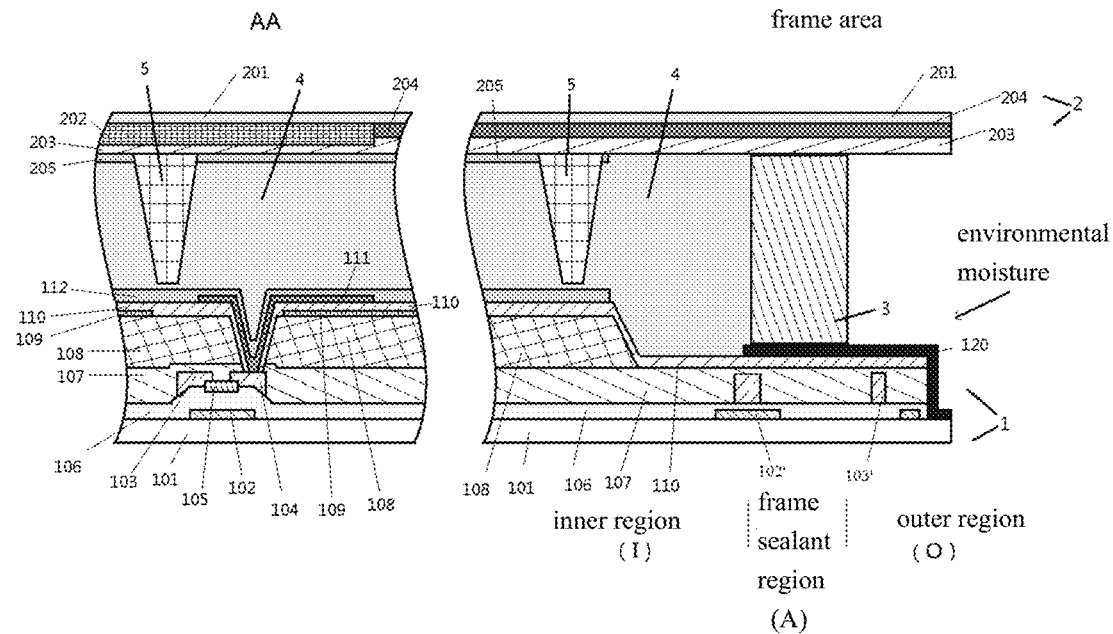
FIG. 9 is a schematic cross-sectional view of yet another embodiment of the present disclosure.

FIG. 9 schematically shows yet another embodiment of the present disclosure. In this figure, reference numbers the same as in FIG. 8 represent the same structures. In contrast to the water insulation layer 120 in FIG. 8, the water insulation layer 120 in FIG. 9 extends to an interior of the display panel through a gap between the second protective passivation layer 110 and the frame sealant 3, and an orthographic projection of the water insulation layer 120 on the substrate layer 101 extends to the inner region I. As such, the length of the interface between the water insulation layer 120 and the frame sealant 3 is greatly increased, and the requirement for excessively high gluing accuracy is also avoided.

It should be appreciated that the structure and shape of the water insulation layer 120 in the outer region O in FIG. 9 may be selected as appropriate. For example, they are the same as those in any of the embodiments as shown in FIGS. 3-7.

In an embodiment, the display panel further comprises a pixel electrode layer on a side of the second protective passivation layer close to the opposite substrate in the active display area, and the water insulation layer and the pixel electrode layer are disposed in the same layer.

Figure 10:
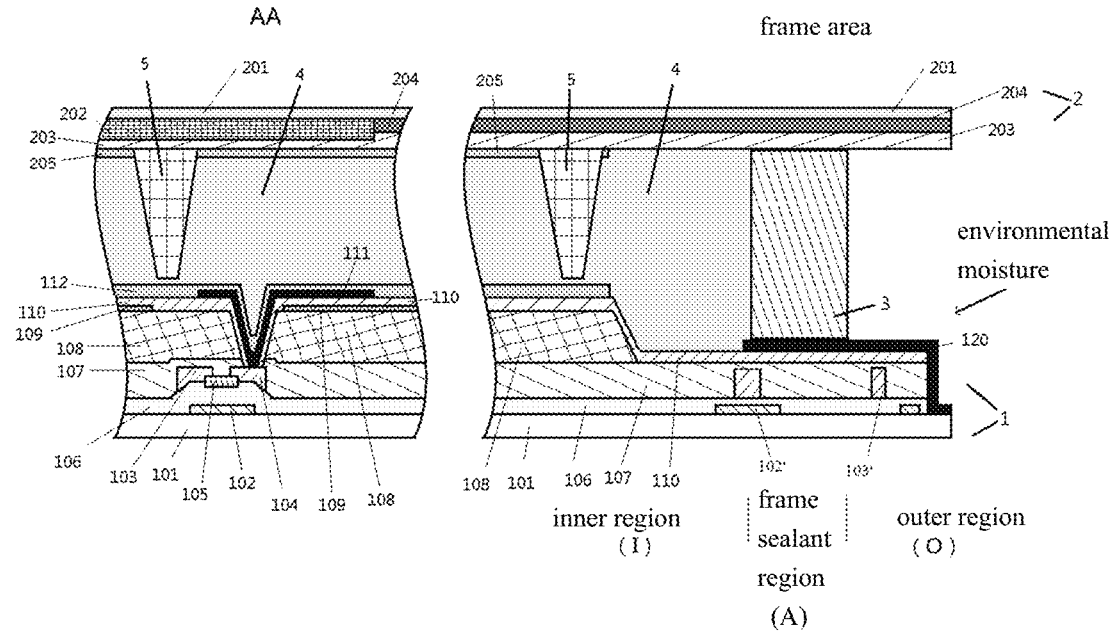
FIG. 10 is a schematic cross-sectional view of yet another embodiment of the present disclosure.

FIG. 10 schematically shows yet another embodiment of the present disclosure. In this figure, reference numbers the same as in FIG. 9 represent the same structures. In contrast to FIG. 9, in FIG. 10, the water insulation layer 120 and the pixel electrode layer 111 are disposed in the same layer and indicated by the same color.

In the present disclosure, the expression "being disposed in the same layer" means that the water insulation layer 120 and the pixel electrode layer 111 are prepared in one preparation step simultaneously, but not that both of them are at the same relative height to the substrate layer. Disposing the water insulation layer 120 and the pixel electrode layer 111 in the same layer may achieve the preparation of the water insulation layer 120 with existed apparatuses and materials in related art only by changing the mask without adding any new preparation step.

Preferably, a material for the water insulation layer 120 and the pixel electrode layer 111 is indium tin oxide (ITO). ITO has good water insulation property and good deposition film forming performance, and may also be well bonded to the frame sealant. Thus, it is a suitable material for the water insulation layer.

Figure 11:
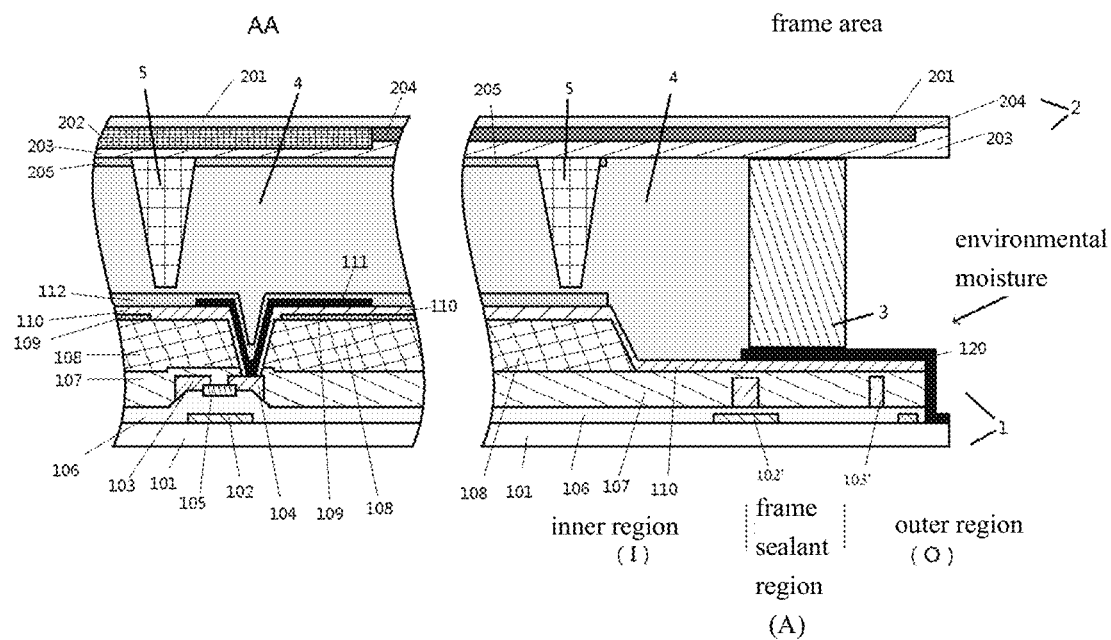
FIG. 11 is a schematic cross-sectional view of yet another embodiment of the present disclosure.

FIG. 11 schematically shows yet another embodiment of the present disclosure. In this figure, reference numbers the same as in FIG. 10 represent the same structures. In contrast to FIG. 10, in FIG. 11, the black matrix 204 in the opposite substrate is recessed at a distance as compared to the substrate 201, thus is not exposed to the environment, and is sealed by the optical transparent layer. Because the material for the black matrix has poor sealing property against water, the embodiment of FIG. 11 is beneficial for protecting the interior of the display panel from being intruded by moisture.

In an embodiment, the display panel further comprises a pixel electrode layer on a side of the second protective passivation layer close to the opposite substrate in the active display area, and the water insulation layer and the pixel electrode layer are disposed in the same layer, and the display panel further comprises a via hole conductive medium layer disposed in the same layer as the pixel electrode layer and the water insulation layer, and the water insulation layer is separated from the via hole conductive medium layer.

It should be noted that in order to reduce the number of masks in the preparation process, some via holes are required to be designed in the frame area of the display substrate through the material for the pixel electrode layer (such as Com ITO and gate electrode/source/drain electrodes metal wires), wherein the material for the pixel electrode layer functions as a conductive medium. Therefore, when the material for the pixel electrode layer is used for forming the water insulation layer of the present disclosure in the same layer, it is required to disconnect them around the above via holes (particular disconnection shape may be a circular shape, a square, or the like, and is not limited), thereby avoiding the short circuit among various circuits.

Figure 12:
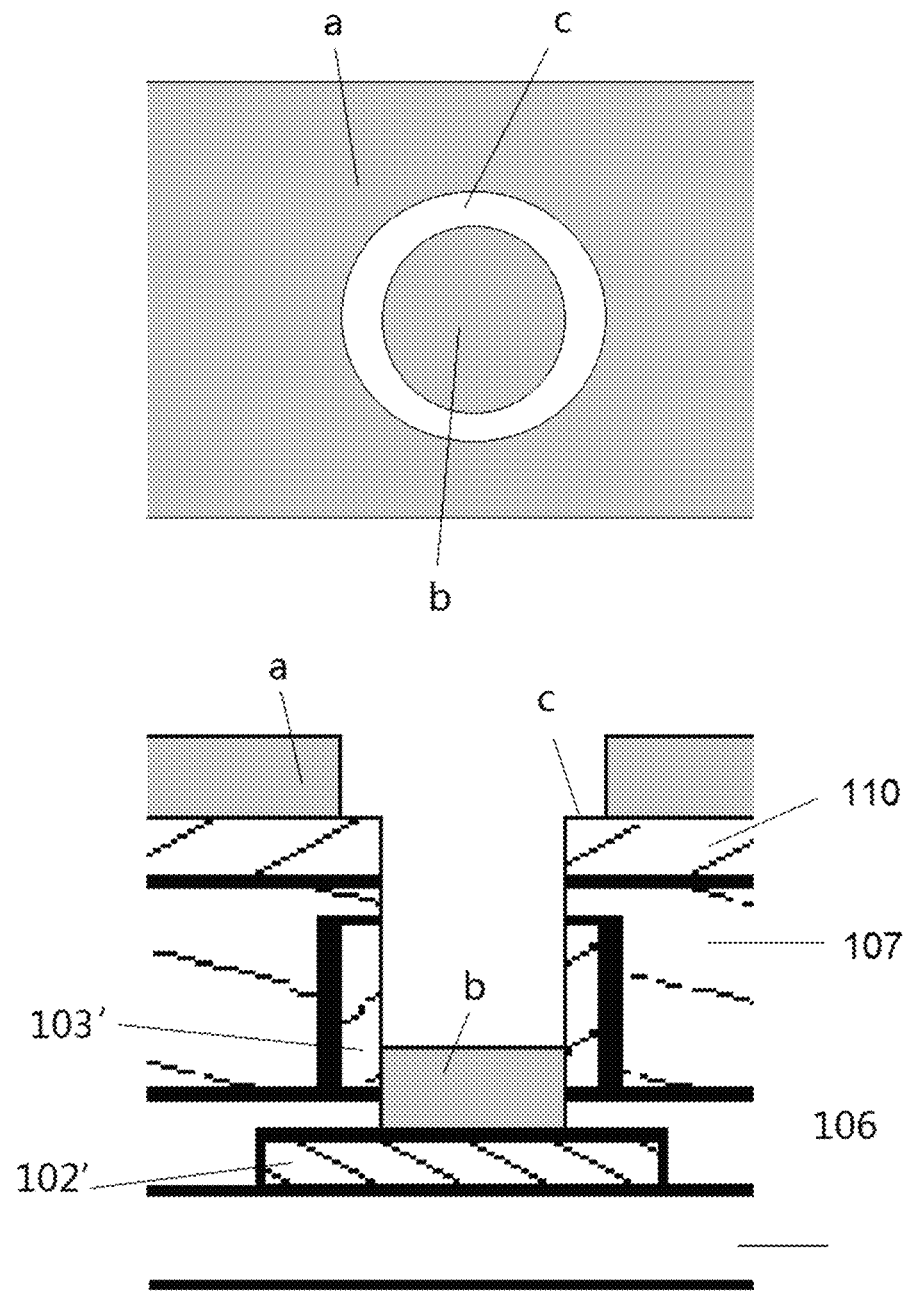
FIG. 12 a mixed schematic view of a via hole according to an embodiment of the present disclosure.

For example, when the via hole is located in the inner region, one embodiment may be as shown in FIG. 12. In FIG. 12, the bottom diagram is a section view, and the top diagram is a top view of the appearance. The via hole passes through the gate electrode insulating layer 106 and the conductive medium is used to connect the electrical components 102', 103', wherein the conductive medium b of the via hole and the water insulation layer a (i.e., 120) are disposed in the same layer. As seen from the top view, the disconnection of the water insulation layer a and the conductive medium b in the via hole is ensured by a circular disconnection region c around the via hole. The circular disconnection region may be achieved by using a patterned mask in the forming process.

Some embodiments of the structure of the display panel of the present disclosure are illustrated above with reference to the drawings. It should be appreciated that the display panel may have other components not shown in the drawings as an example, as long as it does not depart from the spirit of the present application.

The material and dimension features of the structure of the present disclosure may be selected as appropriate. In particular, the organic film layer may be an acrylic epoxy resin layer. It may be formed by applying a coating composition comprising an acrylic epoxy resin, a photosensitive adhesive and a solvent. A material for the first protective passivation layer may be SiNx, SiNO, or a mixed layer thereof. A material for the second protective passivation layer may be SiNx, SiNO, or a mixed layer thereof. In addition to ITO, a material for the water insulation layer may be metal Al, Cu, or an oxide layer which may easily form a film and be suitable for a TFT substrate. The water insulation layer has a thickness in a range from 200 to 2000 Å.

The water insulation layer provided in the present disclosure may allow the components (such as an oxide active layer) in a TFT display panel not to deteriorate due to outgassing, while may prevent water intrusion in a high pressure, high temperature and high humidity environment.

The present disclosure also provides a method for preparing the display panel described above, comprising following steps:

after forming the second protective passivation layer, forming the pixel electrode layer and the water insulation layer simultaneously by a mask deposition process, and after forming the water insulation layer, bonding the array substrate and the opposite substrate with a frame sealant.

The forming process for other components of the display panel may be any suitable process in related art, and is not limited in the present disclosure.

The method of the present disclosure further comprises conventional steps of forming other layers of the array substrate and providing an opposite substrate, liquid crystal, and cell alignment. The method of the present disclosure is characterized in that after forming the second protective passivation layer, the pixel electrode layer and the water insulation layer are formed by a mask deposition process. This may prepare the water insulation layer only by changing the mask without adding a special water insulation layer preparation process.

In the method of the present disclosure, the bonding of the frame sealant is performed after preparing the water insulation layer. If the bonding of the frame sealant is first performed, it is difficult to form the water insulation layer at the edge of the display panel.

The above steps of the method of the present disclosure only need to meet the desired sequence, and there may be other appropriate actions between various actions. For example, there may be a pixel preparation step after forming the water insulation layer and before the bonding.

Preferably, before forming the water insulation layer by the mask deposition process, a predetermined frame sealant region is set;

an inner edge of an orthographic projection of the water insulation layer formed by the mask deposition process on the substrate layer is inside an inner edge of an orthographic projection of the predetermined frame sealant region on the substrate layer and keeps a distance of 1.8 µm or more from the inner edge of the orthographic projection of the predetermined frame sealant region on the substrate layer, and a frame sealant is applied in the predetermined frame sealant region to bonding the array substrate and the opposite substrate.

The predetermined frame sealant region is a region expected to be coated with the frame sealant. In view of the applying error of at least 0.8 µm in the applying of the frame sealant and the edge error of at least 1 µm in the deposition of the water insulation layer, in order to ensure that the water insulation layer of the embodiment as shown in FIG. 10, for example, is formed, an inner edge of an orthographic projection of the water insulation layer on the substrate layer is inside an inner edge of an orthographic projection of the predetermined frame sealant region on the substrate layer, and should keep a distance of 1.8 µm or more from the inner edge of the orthographic projection of the predetermined frame sealant region on the substrate layer.

The desired water insulation layer may be conveniently formed by the method of the present disclosure.

EXAMPLES

Comparative Example 1-1

Multiple batches of 15.6 inch full high definition (FHD) oxide thin film transistor liquid crystal display panels as shown in FIG. 1 were prepared by a conventional process, wherein the organic film layer 104 was an acrylic epoxy resin layer formed by applying a coating composition comprising an acrylic epoxy resin, a photosensitive adhesive and a solvent. A material for the oxide semiconductor active layer 102 was IGZO (indium gallium zinc oxide), the first protective passivation layer 103 was a silicon nitride layer with a refractive index of 1.90, and the second protective passivation layer was a silicon nitride layer with a refractive index of 1.87. The magnitude of the refractive index reflects the degree of compactness of the film layer. The greater the refractive index, the higher the compactness is. The display panel did not comprise the water insulation film as proposed in the present disclosure. A TFT performance measurement and a PCT test were carried out on the prepared display panel. Here, the condition for the PCT test was at a temperature of 121° C., a humidity of 100%, and a pressure of 2 atm. As a result, the display panel had a qualified TFT performance, but failed after 6 hours in the PCT test, with a fluctuant failure rate among various batches.

Comparative Example 1-2

The display panel was prepared in the same manner as in Comparative Example 1-1, except that the second protective passivation layer was changed to a silicon nitride layer with a refractive index of 1.89. A TFT performance measurement and a PCT test were carried out on the prepared display panel. As a result, the display panel could withstand the PCT test for 24 hours, with a stable failure rate among various batches, but had an unqualified TFT performance. Compared to Comparative Example 1, the results indicates that the increase in the compactness of the second protective passivation layer may make the display panel may withstand the PCT test, but will adversely affect the TFT performance. Without being bounded to any theory, the unqualified TFT performance may result from the outgassing of the organic film therein.

Example 1

The display panel was prepared in the same manner as in Comparative Example 1-1, except that the water insulation layer 120 as shown in FIG. 10 was provided. A TFT performance measurement and a PCT test were carried out on the prepared display panel. As a result, the display panel could withstand the PCT test for 24 hours, with a stable failure rate among various batches, and also had a completely qualified TFT performance. Compared to Comparative Examples 1-1 and 1-2, the results indicates that providing the water insulation layer of the present disclosure may ensure that the display panel may withstand the PCT test, while maintaining a qualified TFT performance.

Comparative Example 2-1

Multiple batches of 15.6 inch ultra high definition (UHD) oxide thin film transistor liquid crystal display panels as shown in FIG. 1 were prepared by a conventional process, wherein the organic film layer 104 was an acrylic epoxy resin layer formed by applying a coating composition comprising an acrylic epoxy resin, a photosensitive adhesive and a solvent. A material for the oxide semiconductor active layer 102 was IGZO (indium gallium zinc oxide), the first protective passivation layer 103 was a silicon nitride layer with a refractive index of 1.90, and the second protective passivation layer was a silicon nitride layer with a refractive index of 1.87. The magnitude of the refractive index reflects the degree of compactness of the film layer. The greater the refractive index, the higher the compactness is. The display panel did not comprise the water insulation film as proposed in the present disclosure. A TFT performance measurement and a PCT test were carried out on the prepared display panel. Here, the condition for the PCT test was at a temperature of 121° C., a humidity of 100%, and a pressure of 2 atm. As a result, the display panel had a qualified TFT performance, but failed after 6 hours in the PCT test, with a fluctuant failure rate among various batches.

Comparative Example 2-2

The display panel was prepared in the same manner as in Comparative Example 2-1, except that the second protective passivation layer was changed to a silicon nitride layer with a refractive index of 1.89. A TFT performance measurement and a PCT test were carried out on the prepared display panel. As a result, the display panel could withstand the PCT test for 24 hours, with a stable failure rate among various batches, but had an unqualified TFT performance. Compared to Comparative Example 1, the results indicates that the increase in the compactness of the second protective passivation layer may make the display panel may withstand the PCT test, but will adversely affect the TFT performance. Without being bounded to any theory, the unqualified TFT performance may result from the outgassing of the organic film therein.

Example 2

The display panel was prepared in the same manner as in Comparative Example 2-1, except that the water insulation layer 120 as shown in FIG. 10 was provided. A TFT performance measurement and a PCT test were carried out on the prepared display panel. As a result, the display panel could withstand the PCT test for 24 hours, with a stable failure rate among various batches, and also had a completely qualified TFT performance. Compared to Comparative Examples 2-1 and 2-2, the results indicates that providing the water insulation layer of the present disclosure may ensure that the display panel may withstand the PCT test, while maintaining a qualified TFT performance.

Comparative Example 3-1

Multiple batches of 14 inch full high definition (FHD) oxide thin film transistor liquid crystal display panels as shown in FIG. 1 were prepared by a conventional process, wherein the organic film layer 104 was an acrylic epoxy resin layer formed by applying a coating composition comprising an acrylic epoxy resin, a photosensitive adhesive and a solvent. A material for the oxide semiconductor active layer 102 was IGZO (indium gallium zinc oxide), the first protective passivation layer 103 was a silicon nitride layer with a refractive index of 1.90, and the second protective passivation layer was a silicon nitride layer with a refractive index of 1.80. The magnitude of the refractive index reflects the degree of compactness of the film layer. The greater the refractive index, the higher the compactness is. The display panel did not comprise the water insulation film as proposed in the present disclosure. A TFT performance measurement and a PCT test were carried out on the prepared display panel. Here, the condition for the PCT test was at a temperature of 121° C., a humidity of 100%, and a pressure of 2 atm. As a result, the display panel had a qualified TFT performance, but failed after 12 hours in the PCT test, with a fluctuant failure rate among various batches of 40%-100%.

Example 3

The display panel was prepared in the same manner as in Comparative Example 3-1, except that the water insulation layer 120 as shown in FIG. 10 was provided. A TFT performance measurement and a PCT test were carried out on the prepared display panel. As a result, the display panel could withstand the PCT test for 24 hours, with a stable failure rate among various batches, and also had a completely qualified TFT performance. Compared to Comparative Example 3-1, the results indicates that providing the water insulation layer of the present disclosure may ensure that the display panel may withstand the PCT test, while maintaining a qualified TFT performance.

The thin film transistor liquid crystal display panel provided in the present disclosure may prevent the exhaust gas of the organic film from influencing the TFT performances, while ensuring the water resistance of the display panel under harsh conditions.

Obviously, modifications and variations on the embodiments of the present disclosure may be made by those skilled in the art without departing from the spirit and scope of the present application. As such, if these modifications and variations fall within the scopes of the claims of the present application or equivalents thereof, the present application is intended to encompass these modifications and variations.

What is claimed is:

1. A thin film transistor liquid crystal display panel having an active display area and a frame area, the thin film transistor liquid crystal display comprising:
   an array substrate and an opposite substrate opposite to the array substrate, wherein the array substrate comprises a substrate layer and a thin film transistor on a side of the substrate layer close to the opposite substrate;
   a liquid crystal layer and a spacer between the array substrate and the opposite substrate; and
   a frame sealant for bonding the array substrate and the opposite substrate in the frame area, wherein an orthographic projection of the frame sealant on the substrate layer divides the frame area into an inner region surrounded by the orthographic projection of the frame sealant, a frame sealant region in which the orthographic projection of the frame sealant is located, and an outer region outside the orthographic projection of the frame sealant,
   wherein the display panel further comprises a first protective passivation layer on a side of the thin film transistor close to the opposite substrate, an organic film layer on a side of the first protective passivation layer close to the opposite substrate, and a second protective passivation layer on a side of the organic film layer close to the opposite substrate, wherein a permeability of an exhaust gas of the organic film layer into material of the second protective passivation layer is higher than that into material of the first protective passivation layer, wherein the material of the first protective passivation layer and the material of the second protective passivation layer are both silicon nitride, wherein the first protective passivation layer and the second protective passivation layer have different refractive indexes, and wherein the first protective passivation layer and the second protective passivation layer are in contact with the organic film layer,
   wherein an orthographic projection of the second protective passivation layer on the substrate layer extends to the outer region, and
   wherein the display panel further comprises a water insulation layer, which covers a portion of the second protective passivation layer where its orthographic projection on the substrate layer is in the outer region, such that the second protective passivation layer is not in contact with an external environment of the display panel.

2. The display panel according to claim 1, wherein the thin film transistor comprises an oxide thin film transistor.

3. The display panel according to claim 1, wherein the display panel further comprises a pixel electrode layer on a side of the second protective passivation layer close to the opposite substrate in the active display area, and the water insulation layer and the pixel electrode layer are disposed in the same layer.

4. The display panel according to claim 1, wherein a material of the water insulation layer comprises indium tin oxide.

5. The display panel according to claim 1, wherein the water insulation layer extends to an interior of the display panel through a gap between the second protective passivation layer and the frame sealant, such that an orthographic projection of the water insulation layer on the substrate layer extends to the inner region.

6. The display panel according to claim 1, wherein the water insulation layer covers portions of all layers of the array substrate except the substrate layer where their orthographic projections on the substrate layer are in the outer region, such that all layer of the array substrate other than the substrate layer are not in contact with the external environment of the display panel.

7. The display panel according to claim 1, wherein an outer edge of an orthographic projection of the water insulation layer on the substrate layer is located in the outer region and keeps a distance from an edge of the display panel, wherein the distance is not zero.

8. The display panel according to claim 1, wherein an orthographic projection of the water insulation layer on the substrate layer covers the entire outer region.

9. The display panel according to claim 1, wherein the display panel further comprises a pixel electrode layer on a side of the second protective passivation layer close to the opposite substrate in the active display area, and the water insulation layer and the pixel electrode layer are disposed in the same layer, and
   the display panel further comprises a via hole conductive medium layer disposed in the same layer as the pixel electrode layer and the water insulation layer, and
   the water insulation layer is separated from the via hole conductive medium layer.

10. A method for preparing the display panel according to claim 1, comprising following steps:
   after forming the second protective passivation layer, forming the pixel electrode layer and the water insulation layer simultaneously by a mask deposition process, and
   after forming the water insulation layer, bonding the array substrate and the opposite substrate with a frame sealant.

11. The method according to claim 10, wherein
   before forming the water insulation layer by the mask deposition process, a predetermined frame sealant region is set;
   an inner edge of an orthographic projection of the water insulation layer formed by the mask deposition process on the substrate layer is inside an inner edge of an orthographic projection of the predetermined frame sealant region on the substrate layer and keeps a distance of 1.8 µm or more from the inner edge of the orthographic projection of the predetermined frame sealant region on the substrate layer, and
   a frame sealant is applied in the predetermined frame sealant region to bonding the array substrate and the opposite substrate with the frame sealant.

* * * * *